United States Patent [19]
Goldenberg et al.

[11] 4,069,392
[45] Jan. 17, 1978

[54] DUAL SPEED FULL DUPLEX DATA TRANSMISSION

[75] Inventors: Henry Robert Goldenberg, Hazlet; Richard John Peck, Eatontown; Shih Yung Tong, Holmdel; David Allen Webb, Bricktown, all of N.J.

[73] Assignee: Incorporated Bell Telephone Laboratories, Murray Hill, N.J.

[21] Appl. No.: 737,789

[22] Filed: Nov. 1, 1976

[51] Int. Cl.² ............................ H04Q 5/00; H04M 11/06
[52] U.S. Cl. .................................. 178/58 R; 178/3; 179/2 DP; 179/4
[58] Field of Search ............... 178/58 R, 4.1 B, 2 R, 178/2 B, 2 C, 2 D, 2 E, 3; 179/2 DP, 4, 15 BV; 343/175, 176, 179

[56] References Cited
U.S. PATENT DOCUMENTS

| | | | |
|---|---|---|---|
| Re. 27,864 | 1/1974 | Davis et al. .................... | 178/58 R |
| 3,113,176 | 12/1963 | Doktor et al. ................... | 178/3 |
| 3,457,550 | 7/1969 | Gibson et al. ................... | 179/2 DP |
| 3,609,241 | 9/1971 | Riethmeier ...................... | 179/4 |
| 3,937,882 | 2/1976 | Bingham ......................... | 178/58 R |
| 4,000,371 | 12/1976 | Ogawa ........................... | 178/3 |

*Primary Examiner*—Thomas A. Robinson
*Attorney, Agent, or Firm*—Joseph P. Kearns; Charles Scott Phelan

[57] ABSTRACT

A dual-speed, dual format full-duplex two-wire voice-band data transmission system provides automatic speed selection at the answering terminal responsive to a handshaking sequence which is compatible with existing systems operating at telegraph speeds. Existing systems provide asynchronous full-duplex serial data transmission in the speed range of zero to 300 bits per second using frequency-shift keying of tones in split frequency bands dedicated to the respective transmisson directions. Alternative full-duplex serial data transmission at 1200 bits per second using phase-shift keying of carrier waves in these same split frequency bands can now be provided from a common line protocol.

7 Claims, 2 Drawing Figures

DUAL SPEED FULL DUPLEX DATA TRANSMISSION

FIELD OF THE INVENTION

This invention relates to the transmission of serial data over facilities of limited bandwidth and, in particular, to full-duplex transmission at selectable speeds over voice frequency channels of the switched telephone network.

BACKGROUND OF THE INVENTION

U.S. Pat. No. 3,113,176 issued on Dec. 3, 1963 to T. L. Doktor, G. Parker and L. A. Weber describes a semiautomatic full-duplex data transmission system specifically adapted to the communication of asynchronous teletypewriter signals between terminals connected through the switched telephone network. The telephone voiceband is divided into a lower and an upper band, designated respectively F1 band and F2 band. Frequency-shift keying (FSK) is employed in each band such that the F1 band has a spacing frequency of 1070 Hz and a marking frequency of 1270 Hz and the F2 band has a spacing frequency of 2025 Hz and a marking frequency of 2225 Hz. The terminals are mirror images of each other and either terminal can originate calls to which the other can respond. A direction-of-transmission convention is adopted such that the originating terminal transmits in the low F1 band and receives in the high F2 band and the answering terminal transmits in the high F2 band and receives in the low F1 band.

Each teletypewriter terminal, according to the patented disclosure, is provided with an attendant telephone subscriber set capable of dialing up calls through telephone central offices. Assuming the presence of attendants at two terminals between which teletypewriter messages are to be exchanged, the originating attendant goes off-hook, waits for dial tone, and dials up the number assigned to the answering terminal. The telephone central office, in response to the dialed digits, performs the conventional switching action to extend the calling terminal to the called terminal.

The answering attendant, hearing the ringing signal, goes off-hook and operates an answer key. A timer is started to bridge a silent interval during which the off-hook signal is returned to the telephone central office. The answering terminal then transmits the high-band marking frequency of 2225 Hz to notify the originating terminal of the completion of the connection.

The originating terminal recognizes the 2225 Hz answering tone and responds with the low-band marking frequency of 1270 Hz.

Both terminals are now in the clear-to-send condition and both attendants can return the telephone handsets to the on-hook condition. Teletypewriters at both terminals can send their messages in an FSK mode. Calls are terminated by either terminal by transmitting a continuous spacing signal in the appropriate frequency band.

It is also known to equip either or both terminals for automatic calling and answering without the presence of an attendant.

A commercially available data set providing the above-described capabilities is designated Western Electric Type 103.

In U.S. Pat. No. 3,937,882 granted to J. A. C. Bingham on Feb. 10, 1976 there is disclosed a full-duplex two-wire communication system for synchronous serial data transmission over voiceband channels. The channel is frequency-divided into an upper and a lower band for directional purposes as in the low-speed asynchronous application, but the synchronous timing permits scaling up the data rate by a factor of four. Quadrature amplitude modulation on fixed carrier waves near the centers of the upper and lower bands is suggested as preferable. Start-up line protocol appears to comprise manual origination followed by the exchange of a high-band steady tone burst and a low-band phase-shift-keyed (PSK) signal between answering and origination stations. The Bingham system contemplates a single synchronous transmission speed.

It is an object of this invention to provide a dual speed, full-duplex data transmission system on two-wire analog transmission facilities connecting geographically separated terminals.

It is another object to provide a full-duplex data transmission system at not less than two distinct bit rates over the switched telephone network.

It is a further object to provide a dual-speed, full-duplex data transmission system in which the answering station automatically adapts to the speed of the originating terminal.

It is a still further object to provide a dual-speed, dual-format, full-duplex data transmission system in which the answering station automatically adapts to the speed and format of the originating station.

It is yet another object of this invention to provide a consistent line protocol in a dual-speed, dual-format, full-duplex data transmission system which protocol automatically instructs the answering station to adopt the correct responsive condition and assures the originating station that its instructions are being followed.

It is an additional object of this invention to provide a line protocol which is at once compatible with an existing low-speed data transmission system and yet allows data transmission at an alternative speed and format.

SUMMARY OF THE INVENTION

In accordance with this invention, supervisory control over the speed and format of a full-duplex, serial-binary data transmission system operating over a two-wire facility is exercised by a consistent line protocol by which one station marks itself as an originating station, selects the desired transmission speed and format, advises another station of its selection, instructs and causes the other station to adapt its speed and format to this selection as an answering station, and is assured by the answering station that the desired conditions have been established before any messages are transmitted.

In the illustrative embodiment two distinct bit rates (speeds) are disclosed. The low-speed bit-rate is called 300 bits per second (BPS). The high-speed rate is designated 1200 BPS. Distinctive formats are associated with each of the speeds. The nominal 300 BPS speed is fully asynchronous and is implemented by an FSK format, substantially matching that of the existing Western Electric Data Set Type 103.

The 1200 BPS speed is synchronous and is implemented by differentially encoded phase-shift keying (PSK) using high- and low-band 2400 Hz and 1200 Hz carrier waves modulated on four levels. The symbol rate is 600 baud. In order to provide a substantially uniform energy level and protect against loss of synchronism transmitted signals are scrambled before modulation. Because of the scrambler, received signals are descrambled after demodulation. In addition, the high-speed format can be prearranged for a character asynchronous mode of operation. In this mode, which must be the same between connected terminals, start-stop characters in nine- and ten-bit (including start and stop bits) codes are presented at the customer interface substantially synchronously at 1200 BPS within characters and asynchronously between characters.

The line protocol for the low-speed format is substantially identical to that employed in existing low-speed data modems. Compatible two-way communication is possible in the low-speed format between the dual-speed modem and existing low-speed modems and either type of modem can originate messages to the other. Steady sinusoidal supervisory tones are used in the low-speed protocol.

In the high-speed format once the originating station is assured of the availability of the answering station by recognizing the high-band steady tone, the originating station notifies the answering station of its intention to proceed at the 1200 BPS speed by transmitting the scrambled mark. The scrambled mark is generated by applying a marking (conventionally a negative voltage) signal to the scrambler which encodes it as a pseudorandom bit sequence at 1200 BPS. The latter sequence is in turn phase-shift keyed to the line at 600 bauds. The scrambled mark can only be recognized by a 1200 BPS differential PSK demodulator and not at all by a 300 BPS FSK demodulator. For circuit assurance and timing synchronization the answering station acknowledges receipt of the low-band scrambled mark by returning a high-band scrambled mark. Message data transmission can now be commenced in both directions simultaneously.

It is a feature of this invention that data transmission speed is selected by the originating terminal and is adapted to by the answering terminal automatically.

BRIEF DESCRIPTION OF THE DRAWING

The objects and features of this invention will become more apparent from a consideration of the following detailed description and the drawing in which.

DESCRIPTION OF THE ILLUSTRATIVE EMBODIMENT

The existing low-speed full-duplex data transmission system operating at speeds up to 300 BPS, principally between teletypewriter terminals, can operate in a single mode only. Should data communication be required at any other speed or format, a completely redesigned data set would be required.

Figure 1:
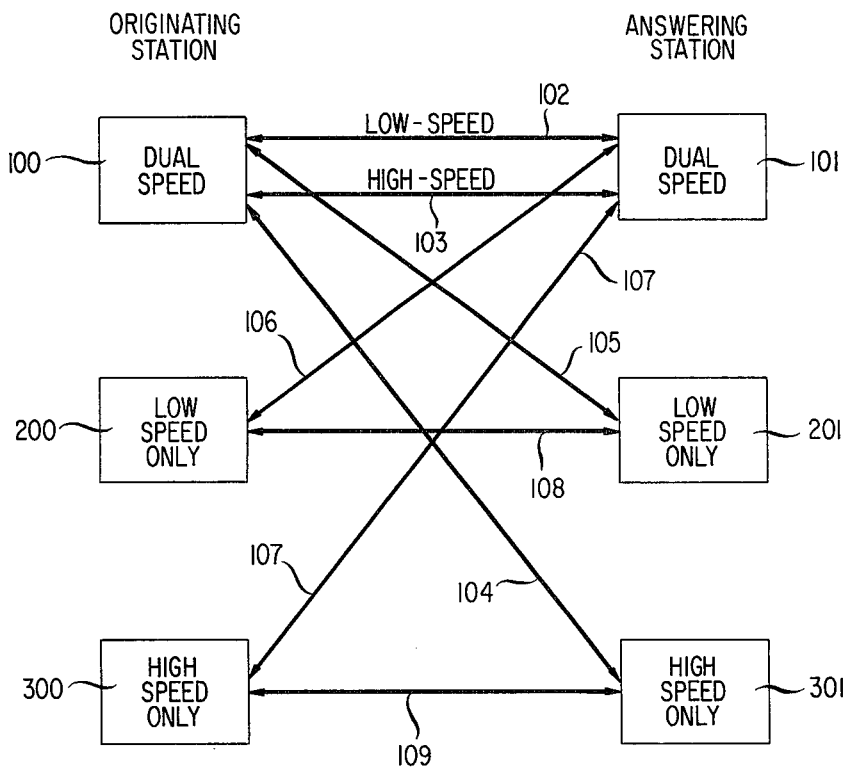
FIG. 1 is an explanatory diagram indicating the different modes of full-duplex data communication between dual-speed, low-speed and high-speed data stations according to this invention.

FIG. 1 illustrates a data communication network in which low-speed, high-speed and dual-speed data sets are connectible. Low-speed only sets 200 and 201 are typical of an existing type previously described. Sets of this type can now communicate only with each other over a path such as that designated 108. High-speed only sets 300 and 301 have only recently become available. They too can communicate only with each other over a single path, such as that designated 109.

A dual-speed data set, as illustrated in blocks 100 and 101 has recently been proposed. As described herein, dual-speed data sets can communicate not only with each other in a low-speed mode over path 102 but also in a high-speed mode over path 103. In addition, dual-speed data sets are compatible with existing low-speed data sets as either originating (path 105) or answering (path 106) stations. Moreover, high-speed data sets 300 and 301 can be made compatible with the high-speed sections of the dual-speed set herein described so that dual-speed set 100 can originate calls over path 104 to high-speed only set 301, and high-speed only set 300 can originate calls to dual-speed set 101. Thus, a communication station including a dual-speed data set is figuratively bilingual and can originate and respond to data calls with two different line signals with another communication station having either a dual-speed, low-speed only, or a high-speed data set.

TABLE I
LOW-SPEED CALL - ATTENDED ORIGINATE AND ANSWER

| ORIGINATING STATION | STATUS | ANSWERING STATION |
|---|---|---|
| Idle State | On-Hook      On-Hook | Idle State |
| Attended Origination | Off-Hook | |
| | Dial Tone | |
| | ⟵ | |
| | Dialing | |
| | ⟶ | ↓ |
| | Ringback     Ringing | |
| | ⟵      ⟶ | |
| | | Off-Hook    Attended Answer |
| Talk Mode | Voice | Talk Mode |
| | ⟵⟶ | |
| Central Office Operations | Delay (About Two Seconds) | Data Key On Time-out Starts |
| Data Key On | 2225 H2 Hi-Band Steady Mark | Transmitter On |
| | ⟵ | |
| Transmission | Short Delay 1270 H2 Lo-Band | |
| Data Transmission Begins | Steady Mark ⟶ | Data Transmission Begins |
| Low-Speed Data Received | Data ⟵⟶ | Time Out Stops After About 15 seconds Low-Speed Data Received |

TABLE I is a sequence chart for the line protocol (exchange of supervisory signals) used in establishing a connection between two low-speed data stations of the Western Electric 103 type when both the originating and terminating stations are attended. The normal idle state exists when both stations have their associated telephone handsets on-hook, i.e., only the ringer is connected across the tip and ring conductors of the telephone subscriber set. The data call is initiated by the originating station attendant when the handset is taken off-hook. The telephone central office recognizes the off-hook condition and returns dial tone. The originating attendant proceeds to dial the appropriate digits assigned to the answering stations. The telephone central office extends the originating call to the answering station by generating a ringing tone, which is also communicated back to the originator as ring back tone. When the answering attendant goes off-hook, ringing stops and both attendants can talk to each other. For a data call both attendants press their data keys. The order in which the keys are pressed is immaterial as long as no more than about fifteen seconds elapses between operations. An abort timer started by data key activation in the answering data set controls this abort interval. Should the timer expire before the originating-station key is pressed, the answering station returns to the on-hook condition.

After a further preprogrammed delay of about two seconds to allow for central office response to the off-hook signal at the answering station, the answering transmitter turns on and sends a high-band steady (sinusoidal) mark at 2225 Hz to the originating station as a ready signal. The orginating station further responds with a low-band steady mark at 1270 Hz. Message data can now be transmitted simultaneously and independently in both directions over a two wire line. Disconnect is indicated by either station by the transmission of a steady space, e.g., 1070 Hz in the low-band originating to answering direction and 2025 Hz in the answering to originating direction or by transferring to talk mode and going on-hook, by data terminal control, or on a loss of received carrier energy.

TABLE II
LOW-SPEED CALL - ATTENDED ORIGINATE, AUTOMATIC ANSWER

| ORIGINATING STATION | STATUS | ANSWERING STATION |
|---|---|---|
| Idle State Attended Origination | On-Hook Off-Hook | On-Hook Idle State |
| | Dial Tone ← | |
| | Dialing → | |
| | Ringback ← Ringing → | Ring Indication |
| | | Auto Answer |
| | Off-Hook | Time-out Starts |
| | Delay (About Two Seconds) 2225 H2 Hi-Band Steady Mark ← | Transmitter On |
| Data Transmission Begins | Short Delay 1270 H2 Lo-Band Steady Mark → | Data Transmission Begins |
| Low-Speed Data Received | Data ←→ | Low-Speed Data Received |

TABLE II constitutes a similar line protocol sequence chart for attended origination and automatic answer. The sequence of TABLE II differs from that of TABLE I principally in that the answering station is equipped with a ringing-tone detector which activates an automatic answering circuit to cause an off-hook appearance, a transfer to data mode and a transmission of the high-band mark at 2225 Hz after the preprogrammed delay period.

Another possible option is an automatic calling unit for the originating station so that the customer terminal can direct the dialing of the answering station number.

The dual-mode data set described herein provides substantially the same line protocol sequences shown in TABLES I and II for the low-speed mode when the latter mode is assumed to be compatible with that in the existing 103-type data set. In addition, the dual-mode set provides another mode operating at a higher data rate in essentially the same low- and high-frequency bands utilized for the low-speed format. Access to the high-speed mode is provided between originating and terminating stations as diagrammed in TABLES III and IV which parallel TABLES I and II respectively.

TABLE III
HIGH-SPEED CALL - ATTENDED ORIGINATE AND ANSWER

| ORIGINATING STATION | STATUS | ANSWERING STATION |
|---|---|---|
| Idle State Attended Origination | On-Hook Off-Hook | On-Hook Idle State |
| | Dial Tone ← | |
| | Dialing → | |
| | Ringback ← Ringing → | |
| Talk Mode | Off-Hook Voice | Attended Answer Talk Mode |
| | ←→ | |
| | Delay | Data key on time-out starts transmitter on |
| Data Key On | 2225 Hz Hi-Band Steady Mark ← | |
| Transmitter On | 1200 Hz Lo-Band PSK Mark → | Transmitter switches to high-speed mode |
| | 2400 Hz Hi-Band PSK Mark ← | |
| Data Received | Data ← | Data Transmitted |
| Data Transmitted | Data ←→ | Time-out stops data received |

TABLE III diagrams a line protocol sequence between two attended data stations. From the idle on-hook condition of both stations through off-hook states of the originating station through dialing and ringing to off-hook, data key on and return of high-band steady mark at 2225 Hz by the answering station, the sequence is identical to that shown in TABLE I. Thereafter, the originating station with data key and transmitter on returns low-band scrambled PSK mark on a carrier wave of 1,200 Hz to the answering station to signal its intention to transmit high-speed message data and to provide a synchronizing signal for the receiver at the answering station. In response to low-band scrambled PSK mark the answering station automatically shifts to the high-speed mode. The answering station then further responds with high-band scarmbled PSK mark on a carrier wave of 2400 Hz to provide a synchronizing signal for the receiver at the originating station.

By a scrambled PSK marking signal is meant a baseband marking signal scrambled into a pseudorandom bit sequence and further phase-shift keyed to a carrier wave for application to the two-wire transmission line.

TABLE IV
HIGH-SPEED CALL - ATTENDED ORIGINATE, AUTOMATIC ANSWER

| ORIGINATING STATION | STATUS | ANSWERING STATION |
|---|---|---|
| Idle State | On-Hook On-Hook | Idle State |
| Attended Originate | Off-Hook | |
| | Dial Tone ← | |
| | Dialing → | |
| | Ringback ← Ringing → | Ring Indication |
| | Off-Hook | Auto answer |
| | Delay (about two seconds) | Time-out starts |
| | 2225 Hz Hi-Band Steady Mark ← | Transmitter on |
| Transmitter On | 1200 Hz Lo-Band PSK Mark → | Transmitter switches to high-speed mode |
| | 2400 Hz Hi-Band PSK Mark ← | High-speed data transmitted |
| High-Speed Data Received | Data ← | Time-out stops |
| High-Speed Data Transmitted | Data ←→ | High-speed data received |

TABLE IV in a similar fashion to TABLE III diagrams the high-speed line protocol sequence between an attended originating station and an answering station provided with a ringing detector and an automatic answering feature. After the step of the sequence paralleling that for the low-speed protocol of TABLE II in which the transmitter at the answering station is turned on and high-band steady mark at 2225 Hz is sent, the transmitter at the originating station turns on and transmits low-band scrambled PSK mark to synchronize the receiver at the answering station. The answering station verifies receipt of the scrambled mark by transmitting high-band scrambled PSK mark to the originating station.

It will be understood that the foregoing sequences are specific illustrations of line protocols for dual-speed and dual-format full-duplex data transmission systems. Either station can include other features, such as, automatic calling for elimination of the need for an attendant at the originating station. Further, it is not intended to limit possible variations to dual formats. More than two speeds and formats are intended to be encompassed within the inventive principle. In addition, a dual-speed station can be preset for single-speed operation. In the event that a single-speed station is addressed by the wrong protocol the appropriate sequence will not be completed and the call will be aborted.

Figure 2:
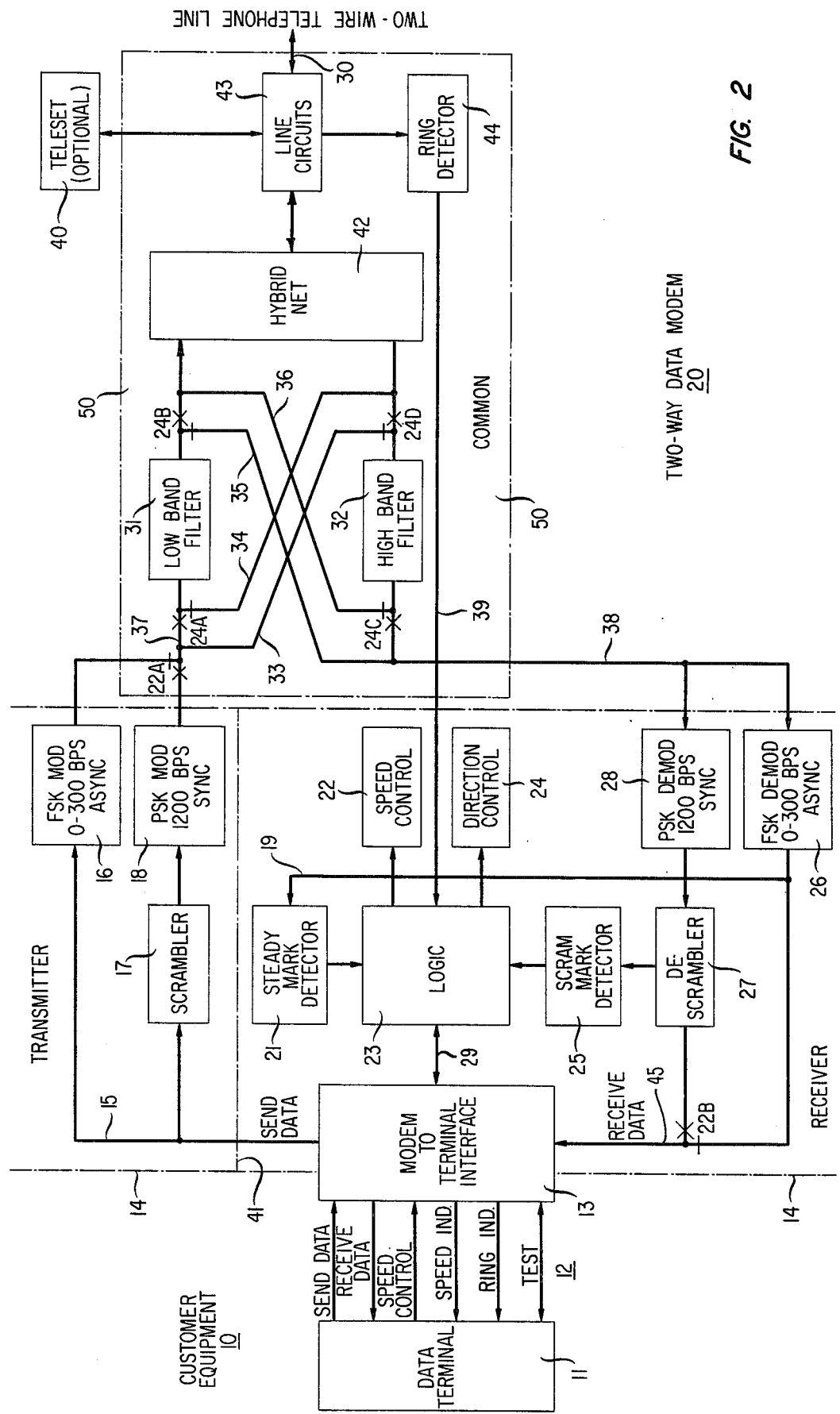
FIG. 2 is a block diagram of a dual-speed, full-duplex data modem usable at each station of a two-wire voice-band telephone channel for serial data transmission at selectable speeds.

Two mirror-image data stations of the type shown in FIG. 2 can provide full-duplex data transmission over a two-wire telephone channel, which includes a central office switching center through which a connection is established by means of conventional dialing techniques. Since each station includes both transmitting and receiving apparatus, it is not necessary to an understanding of the invention to show the other station on the drawing.

Each station of a full-duplex data transmission broadly comprises customer equipment 10, two-way data modem (modulator-demodulator) 20 and attendant's voice teleset 40. An automatic calling unit can be substituted for teleset 40.

Customer equipment 10 can be a teletypewriter station, a computer terminal or other input-output device generating and operating on digital data in either the 0-300 BPS low-speed asynchronous mode or the 1200 BPS high-speed bit-synchronous or character-asynchronous modes. Customer equipment 10 includes data terminal proper 11 and connecting cable 12.

Two-way data modem 20 is a representative apparatus for converting baseband digital data into a line signal compatible with the analog transmission characteristics of a voiceband telephone channel and for reconverting received passband signals from a telephone channel into baseband data in the format acceptable to the data terminal.

Teleset 40 is a voice telephone subscriber set with key features, such as a data-to-talk transfer switch. Teleset 40 is optional. An automatic calling unit under control of terminal 11 can be substituted.

Two-wire telephone line 30 is a conventional customer drop having tip and ring conductors. It is terminated at a telephone central office where conventional switching operations can be performed.

Data interface 13 is a terminal board for the multiconductor cable 12 interconnecting customer data equipment with the data modem. The individual conductors carry data and control signals as the conductor labels indicate. The number of control signals shown are illustrative only and not exhaustive.

Two-way data modem 20 is divided generally into transmitter, receiver and common components. The transmitter proper comprises FSK modulator 16, PSK modulator 18 and scrambler 17. The receiver proper comprises FSK demodulator 26, PSK demodulator 28, descrambler 27, steady mark detector 21, scrambled mark detector 25, speed control 22, and direction control 24. Common components comprise logic circuit 23, low-band filter 31, high-band filter 32, hybrid network 42, line circuits 43 and ring detector 44. Data modem 20 is capable of operating as either an originating station or an answering station. When operating with an originating station transfer contacts 24A through 24F are placed in the make (contacts represented by crosses are closed) condition. Low-band filter 31 is placed in direct circuit between lead 37 at the transmitter output and hybrid network 42. High-band filter 32 is similarly placed in direct circuit between receiver input lead 38 and hybrid network 42. Modulators 16 and 18 are conditioned to operate initially in the low frequency band. Demodulators 26 and 28 are conditioned to operate in the high frequency band. Frequency band changes at the answering station are controlled by the attendant or the ringing indicator.

Station 11 also optionally signals over the speed control lead 29 to logic circuit 23 whereby speed control 22 is alerted as to whether the low- or high-speed mode is desired. For low-speed operation speed control 22 leaves transfer contacts 22A and 22B in the break (represented by the short perpendicular bar) condition.

The output of FSK modulator 16 is connected to lead 37 and the output of FSK demodulator 26 is connected to receive-data lead 45. FSK demodulator 26 has its output connected to steady mark detector 21 over lead 19 in the receiver.

For high-speed operation speed control 22 sets transfer contacts 22A and 22B symbolically shown in detached-contact form in the make condition. PSK modulator 18 is thereby connected to outgoing line 37 and PSK demodulator 45 is connected to receive data line 28. PSK modulator 18 and PSK demodulator 28 have associated with them respectively scrambler 17 and descrambler 27. In practice contacts 22A and 22B are preferably solid-state logic devices embodied in well known J-K flip-flops.

Logic circuit 23 is a straightforward arrangement for controlling the binary states of speed and direction controls 22 and 24 in accordance with binary inputs from detectors 21 and 25.

Scrambler 17 breaks up repeated baseband data patterns, such as, all-space, all-mark, dotting and others, into pseudorandom sequences of extended length for the purposes of preventing energy peaks on the line and of preserving data transitions for sample timing recovery.

Descrambler 27 self-synchronously restores incoming scrambled signals to their original baseband form. Scrambler 17 and descrambler 27 interact in accordance with the teachings of R. D. Fracassi et al., U.S. Pat. No. 3,515,805 issued June 2, 1970. Thus, an all-mark baseband signal is scrambled and PSK modulated onto the telephone line at one station and PSK demodulated and descrambled into a steady mark at the other station. The PSK scrambled mark cannot be detected by the FSK demodulator.

Low-band filter 31 is a bandpass filter centered near 1200 Hz and isolates the low-band frequencies from the high-band frequencies. Simiarly, high-band filter 42 is a bandpass filter centered near 2400 Hz and isolates the high-band frequencies from the low-band frequencies. The positions of the filters are interchanged when the data modem is switched from originating to answering status. Both FSK and PSK frequency spectra fall within the filter bandwidths.

When data modem 20 is operating as an answering station the speed and direction conditions are changed automatically in response to the supervisory signals exchanged with the originating terminal. A low-band steady mark (1270 Hz continuous sinusoidal tone) received by the answering modem from an originating station is recognized by steady mark detector 21, which alerts logic circuit 23. Logic circuit 23 then activates speed control 22 to arrange the answering modem for transmission in the high-band and reception in the low-band at low data speeds, i.e., FSK at 0-300 BPS asynchronous. Contacts 22A and 22B remain in the break condition so that FSK modulator 16 and FSK demodulator 26 are connected respectively to outgoing line 37 and to receive-data lead 28 at interface 13.

A low-band scrambled PSK mark (1200 Hz scrambled PSK) signal received by the answering modem is demodulated by PSK demodulator 28 and descrambled by descrambler 27 into a baseband mark. The descrambled mark is further recognized by scrambled mark detector 25 which in turn provides an output to logic circuit 23. Logic circuit 23 then activates speed control 22 to arrange the answering modem for transmission in the high-band and reception in the low-band at the high data speed, i.e., PSK at 1200 BPS synchronous. Contacts 22A and 22B are switched to the make condition so that PSK modulator 18 and PSK demodulator 28 are connected respectively to outgoing line 37 and to receive data lead 45 at interface 13.

A high-band scrambled mark (2400 Hz scrambled PSK) can also be generated as a supervisory control signal by two-way data modems 20. This signal is used by the answering terminal responsive to the receipt of the low-band scrambled mark to indicate to the originating terminal that it is prepared to operate in the high-speed answering format and to provide receiver timing information to the originating station.

The dual-speed full duplex data modem supplying the background for this invention can also be programmed in the high-speed mode to operate either in a pure synchronous format at a 1200 BPS rate or in a character-oriented asynchronous format. In the character-asynchronous format multibit characters illustratively of nine- or ten-bit length according to known codes can be handled. Buffering is used at each end of the transmission channel to pack and unpack data bits onto and from the synchronous channel by dropping stop bits from transmitted characters and restoring them to received characters in such a way that the overall message bit rate temporarily exceeds the nominal synchronous rate.

FSK modulator 16 and FSK demodulator 26 are functional equivalents of those described in the cited Doktor et al. patent.

PSK modulator 18 can be of the type disclosed in the copending patent application of R. J. Peck (Case 1), Ser. No. 626,657 filed Oct. 29, 1975.

PSK demodulator 28 can be of the type disclosed in the copending patent application of S. Y. Tong Ser. No. 626,659 filed Oct. 29, 1975, now U.S. Pat. No. 3,997,847, issued Dec. 14, 1976. A synchronous timing recovery system for a PSK demodulator is disclosed in the copending patent application of R. J. Peck (Case 2), Ser. No. 626,658 filed Oct. 29, 1975.

The operative part of this invention is the line protocol or handshaking procedure which controls the physical components shown in FIG. 2 of the drawing and previously described. There are three basic line protocols that can be followed:

1. Data modems at both originating and answering stations provide dual-speed, dual-format options;

2. The data modem at the originating station operates solely at the low-speed and that at the answering station operates at either speed; and 3. The data modem at the originating station operates in the dual-speed fashion and that at the answering station operates at a single speed.

Where matching dual-speed modems, such as diagrammed in FIG. 2, are available at both stations of a dialed-up data transmission system, a fixed silent period is maintained on the channel on the order of one or two seconds to allow for telephone central office recognition of the off-hook status of both modems. The answering station, following the sequence of TABLE II, in response to the ringing signal transmits a steady answering tone at 2225 Hz (high-band steady mark) of pure signal wave. At an attended originating station the attendant, upon hearing the high-pitched 225 Hz tone, depresses the data button. In the case of an automatic-calling-unit initiated call the data mode is entered automatically. In about 150 milliseconds the originating station acquires the answering tone and transmits either a steady tone at 1270 Hz (low-band steady mark) to indicate intention to transmit asynchronous data at the asynchronous low speed between 0 and 300 BPS, or a scrambled PSK signal on a 1200 Hz carrier (low-band scrambled mark) to indicate intention to transmit synchronous data at the high speed of 1200 BPS.

The data modem at the answering station requires 150 to 300 milliseconds to recognize, acquire and act on the low-band steady mark or the low-band scrambled mark. Usually the longer period is required to acquire the scrambled mark. If the steady mark is recognized, the answering modem arranges itself for low-speed operation and sends a clear-to-send signal to its associated customer equipment. Two-way 300 BPS data can now be transmitted in both directions.

If the scrambled mark is recognized, as in the sequence of TABLES III or IV, the answering modem arranges itself for high-speed operation, stops the 2225 Hz answer tone, returns high-speed scrambled PSK signal (high-speed scrambled mark) to the originating terminal for circuit assurance and receiver timing synchronization and sends a clear-to-send signal to its associated customer terminal equipment. In response to the high-speed scrambled mark the originating station sends a clear-to-send signal to its customer terminal equipment and two-way 1200 BPS data can now be transmitted in both directions.

Where the answering station has no dual-speed option, it cannot respond if signaled at the wrong speed and the data call must be aborted. If signaled at the correct speed, the answering station will respond according to the line protocol previously described.

Although a specific illustrative embodiment has been shown and described, it will be understood that various modifications, such as the provision of more than two speeds or signaling formats, can be made without departing from the spirit of the invention within the scope of the following claims.

What is claimed is:

1. In a data transmission system including a two-way point-to-point transmission channel capable of conveying supervisory signals and message-data signals between data stations;
    transmitting means at each station selectively operable at more than one data transmission speed and format comprising at least a low-speed asynchronous data modulator, a high-speed synchronous data modulator, and means for connecting said low-speed and high-speed modulators alternatively to said transmission channel;
    receiving means at each station selectively operable at more than one data transmission speed and format comprising at least a low-speed asynchronous demodulator compatible with said low-speed modulator, a high-speed synchronous demodulator compatible with said high-speed modulator, and means for connecting said low-speed and high-speed demodulators alternatively between said transmission channel and said station; and
    supervisory signaling means at each station for exchanging control signals before message data transmission over said transmission channel between the station first to mark itself as an originating station to cause another station to adapt itself as an answering station to the speed and format of the originating station comprising logic means for controlling the transmission of signals uniquely representing the desired transmission speed and format of an originating station and for recognizing such signals at an answering station.

2. In a data transmission system including a two-way point-to-point transmission channel capable of conveying supervisory signals and message data signals in frequency divided bands between connected data stations;
    transmitting means at each station selectively operable at more than one data transmission speed and format in one or the other of said frequency divided bands;
    receiving means at each station selectively operable at more than one data transmission speed and format in one or the other of said frequency divided bands; and
    supervisory signaling means at each station for exchanging a sequence of control signals before message data transmission over said transmission channel between stations connected through said transmission channel to mark one station as an originating terminal at a selected speed and format in a particular frequency divided band and to cause another station to adapt itself automatically as an answering station to a compatible speed and format and frequency divided band, said supervisory signaling means at an originating station comprising logic means for controlling the transmission of a different supervisory signal for each available transmission speed and format to an answering station and the recognition of further supervisory signals returned by an answering station and said supervisory means at an answering station comprising additional logic means for controlling the transmission of said further supervisory signals to acknowledge the reception of said different supervisory signals from an originating station and for controlling the recognition of said different supervisory signals.

3. In a data transmission system including a two-way, two-wire point-to-point transmission channel capable of conveying supervisory signals and message data signals between connected data stations;
    transmitting means at each station selectively operable alternatively in a low-speed asynchronous frequency-shift keyed format or in a high-speed synchronous phase-shift keyed format comprising a data scrambler for randomizing baseband data to be transmitted in the synchronous format;
    receiving means at each station selectively operable alternatively in a low-speed synchronous frequency-shift keyed format or in a high-speed synchronous phase-shift keyed format comprising a data descrambler for converting randomized received data into baseband message data; and
    supervisory means at each station for controlling an exchange of characteristic signals between two data stations connected to said transmission channel to establish one station as an originating station and another station as an answering station compatible in signaling speed.

4. In a full duplex data transmission system including a two-wire point-to-point transmission channel capable of conveying supervisory signals and message data signals in frequency-divided high and low frequency bands between data stations, the low-frequency band being dedicated to transmission from an originating to an answering data station and the high-frequency band being dedicated to transmission from an answering to an originating station;
    transmitting means at each station selectively operable in said low-frequency band as an originating station or in said high-frequency band as an answering station to transmit data at either a relatively low asynchronous rate or at a relatively high synchronous rate;

receiving means at each station selectively operable in said low-frequency band as an answering station or in said high-frequency band as an originating station to receive data at either a relatively low asynchronous rate or at a relatively high synchronous rate; and supervisory means at each station for interactively controlling the transmission over said transmission channel alternatively of a first steady tone or a second phase modulated tone from an originating station to notify an answering station of an intention to transmit low-speed or high-speed data respectively, the reception of said first and second tones at an answering station, and the transmission of a third steady tone and a fourth phase-modulated tone from an answering station to notify an originating station respectively that a data call is being answered and that transmission is expected at the high-speed rate.

5. A data transceiver for a terminal of a two-way point-to-point transmission channel capable of conveying supervisory signals and message-data signals between the first-mentioned and other terminals comprising:

transmitting means selectively operable at more than one data transmission speed and format further comprising at least a low-speed asynchronous data modulator, a high-speed synchronous data modulator, and means for connecting said low-speed and high-speed modulators alternatively to said transmission channel;

receiving means selectively operable at more than one data transmission speed and format further comprising at least a low-speed asynchronous demodulator compatible with said low-speed modulator, a high-speed synchronous demodulator compatible with said high-speed modulator, and means for connecting said low-speed and high-speed demodulators alternatively between said transmission channel and said terminal; and supervisory signaling means for exchanging control signal before message data transmission over said transmission channel between the terminal first to mark itself as originating to cause another terminal to adapt itself for answering to the speed and format of the first-mentioned terminal further comprising logic means for controlling the transmission of signals uniquely representing the desired transmission speed and format when operating as an originating terminal and for recognizing such signals when operating as an answering terminal.

6. A data transceiver for a terminal of a two-way point-to-point transmission channel capable of conveying supervisory signals and message data signals in frequency divided bands between connected terminals comprising:

transmitting means selectively operable at more than one data transmission speed and format in one or the other of said frequency divided bands;

receiving means selectively operable at more than one data transmission speed and format in one or the other of said frequency divided bands; and supervisory signaling means for exchanging a sequence of control signals before message data transmission over said transmission channel with another terminal connected to said transmission channel to mark itself as an originating terminal at a selected speed and format in a particular frequency divided band and to cause another terminal to adapt itself automatically for answering at a compatible speed and format and frequency divided band, said supervisory signaling means comprising first logic means for controlling the transmission of a different supervisory signal for each available transmission speed and format over said channel and the recognition of further supervisory signals returned from another terminal when operating as an originating terminal comprising second logic means for controlling the transmission of said further supervisory signals to acknowledge the reception of said different supervisory signals from another terminal and for controlling the recognition of said different supervisory signals when operating as an answering terminal.

7. A data transceiver for a terminal of a two-way, two-wire point-to-point transmission channel capable of conveying supervisory signals and message data signals between connected terminals comprising:

transmitting means selectively operable alternatively in a low-speed asynchronous frequency-shift keyed format or in a high-speed synchronous phase-shift keyed format further comprising a data scrambler for randomizing baseband data to be transmitted in the synchronous format;

receiving means selectively operable alternatively in a low-speed synchronous frequency-shift keyed format or in a high-speed synchronous phase-shift keyed format further comprising a data descrambler for converting randomized received data into baseband message data; and supervisory means for controlling an exchange of characteristic signals between two terminals connected to said transmission channel to establish one terminal as an originating terminal and the other terminal as the answering terminal compatible in signaling speed.

* * * * *